(12) United States Patent
Frey et al.

(10) Patent No.: US 6,736,395 B2
(45) Date of Patent: May 18, 2004

(54) ACCESS TO LETTER PATH

(75) Inventors: Roger Frey, Bern (CH); Olivier Conca, Olten (CH); Gerhard Staufer, Niederscherli (CH); Andreas von Niederhausern, Riggisberg (CH)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 0 days.

(21) Appl. No.: 10/081,293

(22) Filed: Feb. 21, 2002

(65) Prior Publication Data

US 2002/0140164 A1 Oct. 3, 2002

Related U.S. Application Data

(60) Provisional application No. 60/270,796, filed on Feb. 23, 2001, provisional application No. 60/277,806, filed on Mar. 22, 2001, provisional application No. 60/277,841, filed on Mar. 22, 2001, provisional application No. 60/277,873, filed on Mar. 22, 2001, provisional application No. 60/277,931, filed on Mar. 22, 2001, provisional application No. 60/277,946, filed on Mar. 22, 2001, and provisional application No. 60/338,892, filed on Nov. 5, 2001.

(51) Int. Cl.$^7$ ................................................ B65H 5/00
(52) U.S. Cl. ..................... 271/273; 271/272; 271/274
(58) Field of Search ........................... 271/264, 272, 271/273, 274; 198/850.4; 292/95, 11, 56, DIG. 11

(56) References Cited

U.S. PATENT DOCUMENTS

| | | | | |
|---|---|---|---|---|
| 961,197 A | * | 6/1910 | Anderson | 292/11 |
| 2,199,467 A | * | 5/1940 | Saunders | 292/48 |
| 2,227,144 A | * | 12/1940 | Krause | 292/1 |
| 3,463,529 A | * | 8/1969 | Rubbio et al. | 292/106 |
| 3,661,383 A | * | 5/1972 | Morrison | 271/273 |
| 3,851,905 A | * | 12/1974 | Klebba | 292/11 |
| 4,903,076 A | * | 2/1990 | Sakakibara | 399/124 |
| 6,113,095 A | * | 9/2000 | Naruse | 271/198 |
| 6,578,845 B2 | * | 6/2003 | Chen | 271/273 |

* cited by examiner

Primary Examiner—Donald P. Walsh
Assistant Examiner—Kaitlin Joerger
(74) Attorney, Agent, or Firm—Perman & Green, LLP

(57) ABSTRACT

A mechanism for freeing document jams in a machine that transports documents, the machine including a housing having an interior portion and a pivotable cover adapted to permit easy access to the interior portion of the machine housing, the cover pivoting from a closed and locked position to an open and locked position and being spring biased is described. The mechanism includes a handle positioned on the cover; a biased rod member having first and second end portions, the rod member being pivotable but otherwise held fixed in the cover and mechanically coupled to the handle; and a slotted cam follower surface positioned on each opposite side of the housing, each surface having a bottom end portion and a top end portion, the first and second end portions of the rod coupled to each opposite side of the housing and adapted to follow the cam follower surfaces wherein the cover is positioned in the closed and locked position when the first and second end portions of the rod are positioned in the bottom end portion of the cam surface slot, and the cover is in an open and locked position when the first and second end portions of the rod are positioned in the top end portion of the cam surface slot.

17 Claims, 4 Drawing Sheets

ACCESS TO LETTER PATH

CROSS-REFERENCE TO RELATED APPLICATIONS

This application claims priority of the following U.S. provisional patent applications: Serial No. 60/270,796 filed on Feb. 23, 2001, Serial No. 60/277,806 filed on Mar. 22, 2001, Serial No. 60/277,841 filed on Mar. 22, 2001, Serial No. 60/277,873, filed on Mar. 22, 2001, Serial No. 60/277,931 filed on Mar. 22, 2001, Serial No. 60/277,946 filed on Mar. 22, 2001 and Serial No. 60/338,892 filed Nov. 5, 2001.

BACKGROUND OF THE INVENTION

1. Field of the Invention

This invention relates to a unique cover assembly that is used in a machine or system typically employed for handling moving documents so as to be able to easily, safely and quickly remove jams resulting from the documents, and more particularly, to a housing having a cover pivotable on the housing which can be positioned in a locked/closed position or a locked/opened position.

2. Brief Description of Related Developments

The prior art describes many different types of covers that open and close on document transporting machines and which enable a user to open up different parts of each of the machines, and thereby be able to clear jams that have occurred due to the moving documents. However, many of the cover assemblies described in the prior art are not able to define a machine cover arrangement that enables a user to easily, safely and quickly get to an area of the machine where a jam of the documents has occurred so as to easily, safely and quickly remove the jam and restart the document moving machine. Previously known solutions to removing jams in document transporting apparatus have required removing major parts of the document transporting apparatus to clear the jam. It is therefore very desirable to have a cover for a housing that is part of a document transporting apparatus that includes a handle feature thereon, that enables the cover to be easily opened, locked in the open position, and kept in an opened position so as to enable the user to safely remove a jam, and then easily close the cover and place the cover in a closed and locked position.

SUMMARY OF THE INVENTION

It is therefore a primary objective of the present invention to overcome the disadvantages exhibited by the prior art and referred to above.

In accordance with the features of the present invention there is described a mechanism for freeing document jams in a machine that transports documents, the machine including a housing having an interior portion and a pivotable cover adapted to permit easy access to the interior portion of the machine housing, the cover pivoting from a closed and locked position to an open and locked position and being spring biased. The mechanism comprises a handle member positioned on the cover; a biased rod member having first and second end portions, the rod member being pivotable, but otherwise held fixed in the cover and mechanically coupled to the handle; and a slotted cam follower surface positioned on each opposite side of the housing, each surface having a bottom end portion and a top end portion, the first and second end portions of the rod coupled to each opposite side of the housing and adapted to follow the cam follower surfaces wherein the cover is positioned in the closed and locked position when the first and second end portions of the rod are positioned in the bottom end portion of the cam surface slot, and the cover is positioned in an open and locked position when the first and second end portions of the rod are positioned in the top end portion of the cam surface slot.

It is therefore a primary objective of the present invention to thereby provide an easy to use, safe and quick mechanism as described above for freeing document jams in a machine that feeds documents.

BRIEF DESCRIPTION OF THE DRAWINGS

The above objects, and other objects and advantages of the present invention will be apparent upon consideration of the following detailed description, taken in conjunction with the accompanying drawings, in which.

DETAILED DESCRIPTION OF THE PREFERRED EMBODIMENTS

The cover apparatus and locking mechanism in accordance with the features of the present invention can be used, for obtaining access to any type of sheet-like material, (such as for example, sheets of plastic, sheets of paper, etc.) which are being fed through some sort of sheet conveying system. For purposes of being able to explain the details of the present invention in the form of an example, this application shall describe a modular postage meter apparatus that is used for applying postage on mailpieces (e.g. envelopes) the mail pieces being fed within a mailing machine or a postage meter itself. However, in accordance with the features of the present invention the mechanism for clearing jams as defined herein can be used in various document transporting machines where jams can occur.

Figure 1:
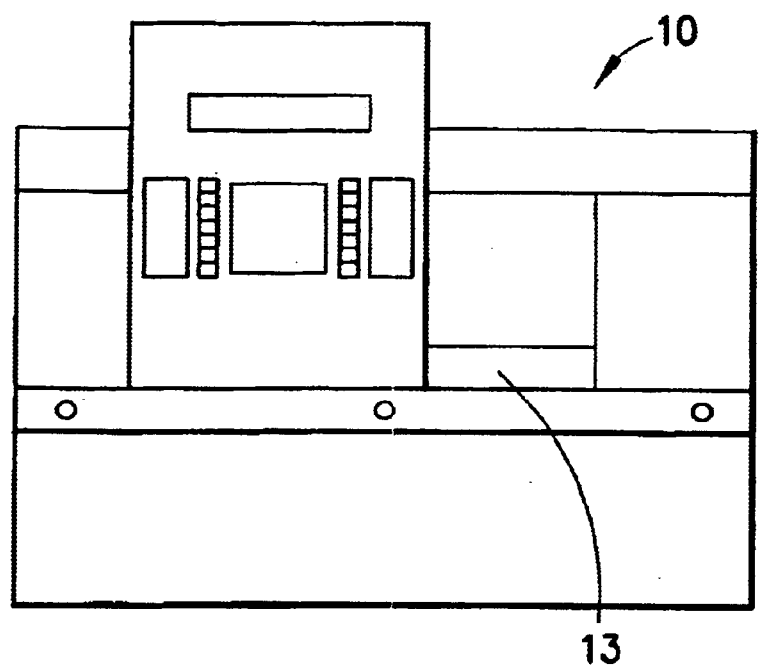
FIG. 1 is a perspective view of a modular postage meter that incorporates the features of the present invention.

In accordance with the example that is being presented herein, mailpieces (e.g. envelopes) being fed with a mailing machine are subject to various issues which could lead to jams of documents in the machine. A mailing machine typically includes a postage meter. A mailing machine as described herein could be a modular mailing machine with a modular postage meter 10 as illustrated in FIG. 1. The postage meter module contains a printhead that prints the postage indicia on an envelope, a host computer, PSD (postal security device) and transport belts 11 (See FIG. 2) which transport envelopes past the printhead where the correct postage is applied to the envelopes.

Figure 2:
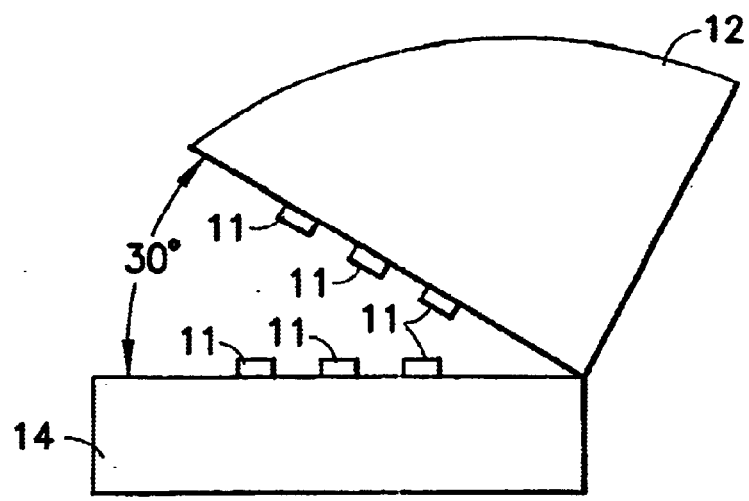
FIG. 2 is a side plan view of a modular postage meter as illustrated in FIG. 1 with its cover in an open and locked position.

Jams occasionally occur in the postage meter module and quick, easy and safe access to the paper path is required. The postage meter unit 10 is built like a clamshell, and the top position can be opened as a cover to get access to the paper path. FIG. 2 illustrates the top portion of the postage meter module or cover 12 in an open position. In order to open the top portion or cover 12, the operator of the postage meter only has to unlatch handle 13 (see FIG. 1) A biasing means such as gas springs are used in the in the lifting mechanism to lift the top portion or cover 12 up off the bottom portion 14 with no major lifting force required by the operator. When the postage meter module is to be shut down, the operator must activate the handle 13 again, and put pressure on the top unit or cover 12 to force it down (overcome the resistance of the gas springs) into the bottom portion 14 (see FIGS. 3 and 4). This assures that the operator's hands are not in the machine when the unit is to be closed. When in an opened position, an opening gives the operator full access to the paper path and therefore easy access to clear jams. When open, the top portion or cover 12 is locked in the open position. When closed the top portion or cover 12 is locked in the closed position. The weight of the top portion is about 20 lbs. The maximum angle formed by the open cover 12 is about 30%.

Figure 3:
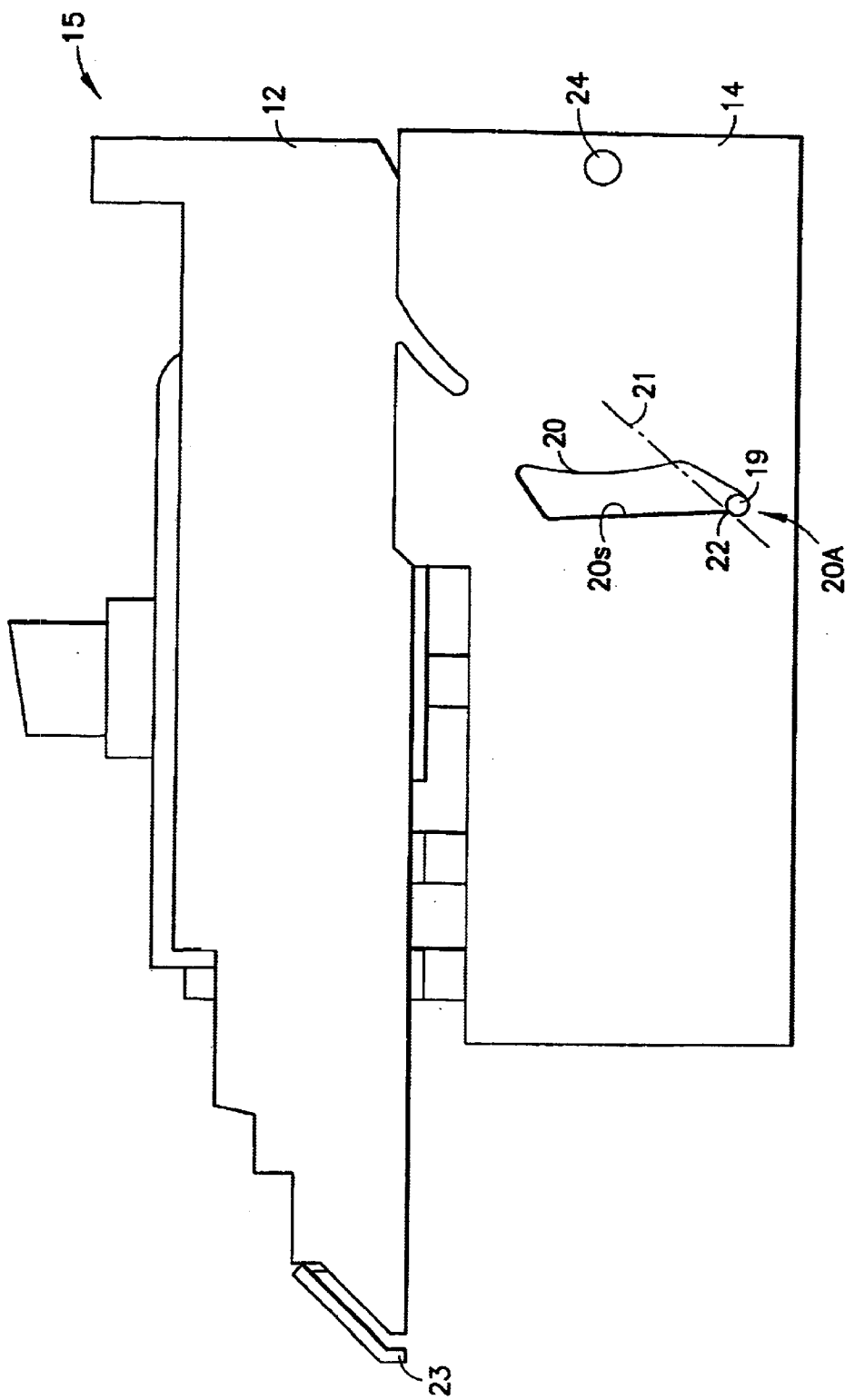
FIG. 3 is a partial side plan view of a housing of a modular postage meter with its cover in a closed and locked position.
Figures 4, 4A:
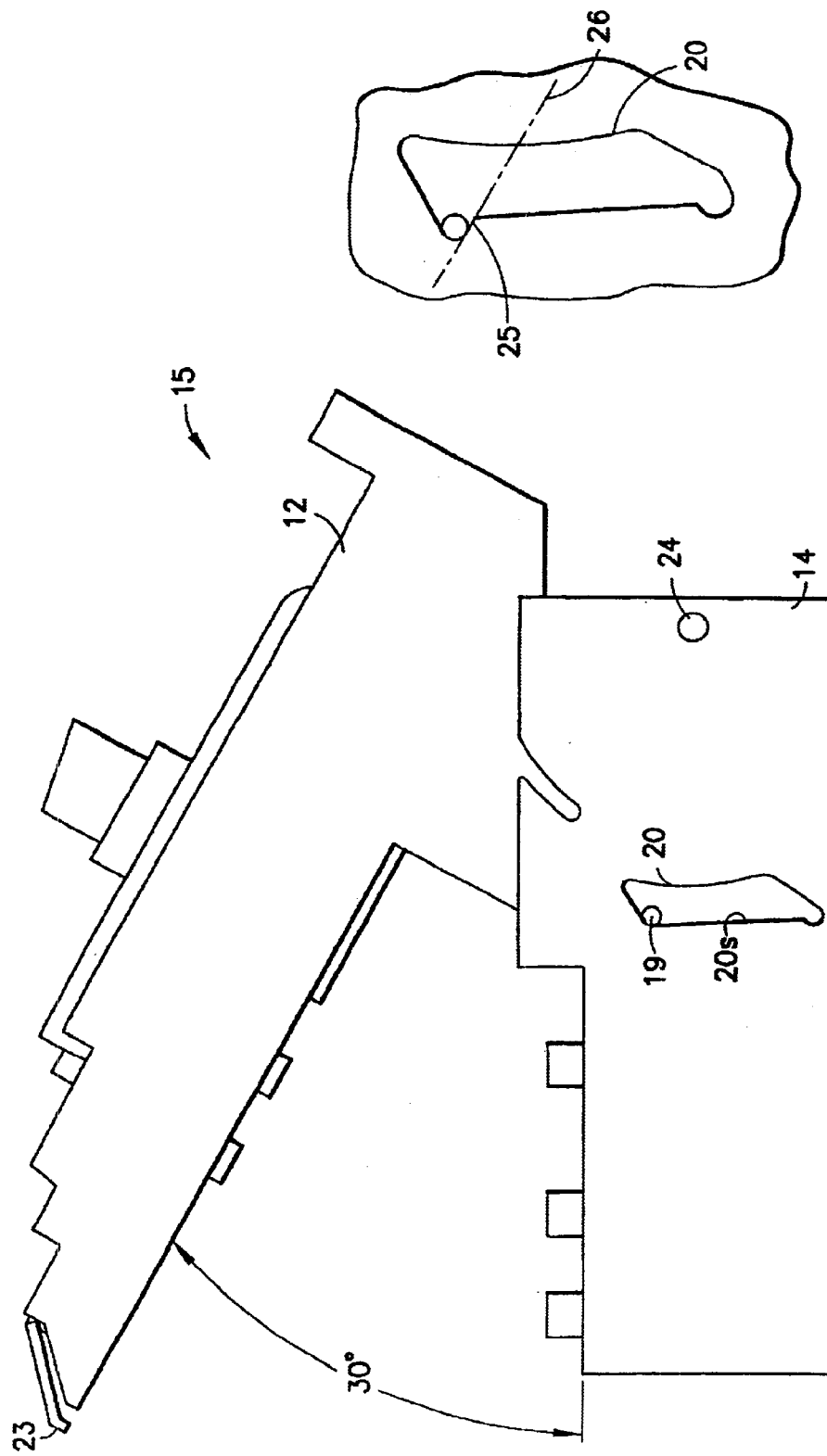
FIG. 4 is a partial side plan view of a housing of a modular postage meter with its cover in an opened and locked position.
FIG. 4A is an enlarged plan view of the slotted cam surface of FIG. 4.

Specifically focussing on FIGS. 3, 4, and 4A there is specifically illustrated how cover 12 can be in an opened and locked position and in a closed and locked position. There is illustrated in FIG. 3 a housing 15 for a modular postage meter with the top portion or cover portion 12 in a closed and locked position resting on the bottom portion of housing 14. Positioned between the side walls of bottom portion 14 is a rod member 16 (not shown in FIG. 3 or 4 but seen in FIG. 5). The rod member can rotate, but otherwise is fixed in position in the top portion of the modular postage meter. Rod member 16 is biased, or spring loaded by a tension spring or a leg, spiral or torsion spring 32 (see FIG. 5) to be biased in the direction of arrow 17 (i.e. biased in a clockwise direction). Rod member 16 includes an arm member 18 positioned at each end of the rod member 16. Projecting from each arm member is a lock peg member 19. It is this lock peg member 19 which projects into and rides along each of the slot cam surfaces 20S (see FIGS. 3 and 4) which slot cams 20 are positioned within each of the two side walls of housing 15. As specifically illustrated in FIG. 3, lock peg member 19 lies in the bottom portion 20A of slot cam 20 on locking plane 21 under the knee portion 22 located on the bottom portion 20A of slot cam 20. In this position housing 15 is in a closed and locked position. To open the housing 15 so as to be in an open and locked position as illustrated in FIG. 4, the operator or user places his or her fingers in the handle (see FIG. 3) 23. By the operator applying a sufficient force to open the cover portion 12 so that it can pivot about pivot point 24, peg member 19 is forced to travel around the knee projection of slot cam 20 and travel up within the slot cam 20 to position itself on the top of the knee portion 25 of the top portion of slot cam 20, i.e. on locking plane 26 (see drawing insert on FIG. 4 for an enlargement of slot cam 20). In this position lock peg member 19 (one on each side of the housing) holds cover 12 in an open and locked position, an opening of an angle of about 30°. To close cover 12 back into the closed and locked position as shown in FIG. 3 all that is necessary is that the operator or user pull the handle 23 to unlock the system and then push down the cover 12 with a certain force to close cover 12 on the base 14 (as shown in FIG. 3).

Figure 5:
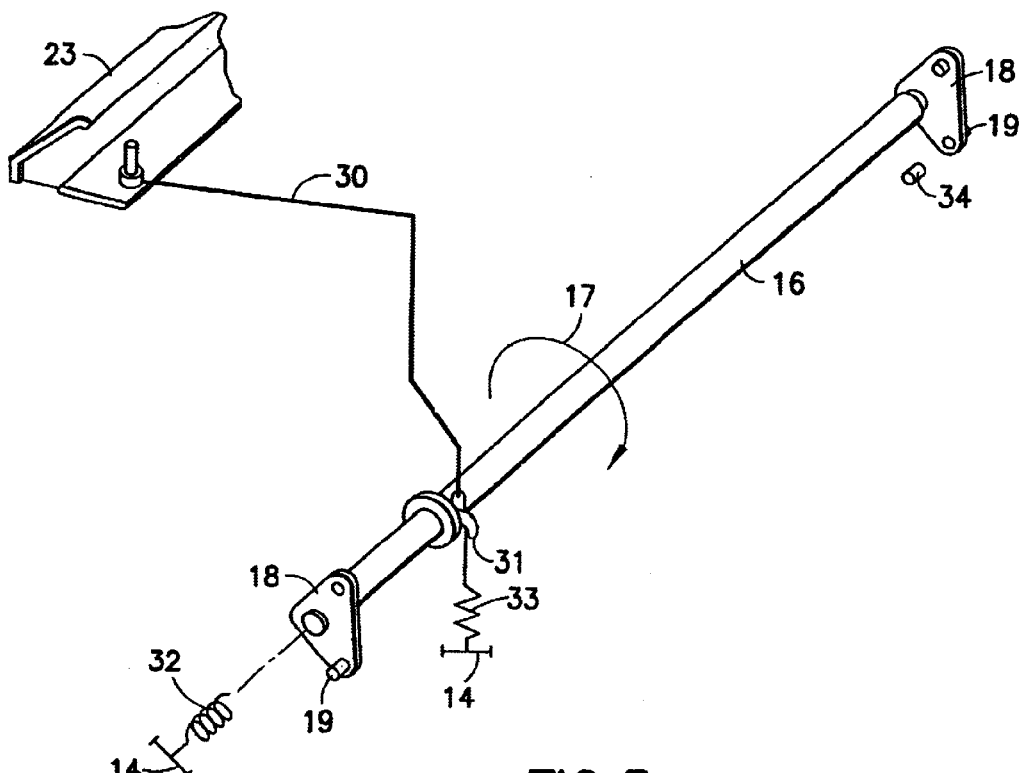
FIG. 5 is a perspective view of a portion of the lock mechanism in accordance with the features of the present invention.

FIG. 5 illustrates that handle 23 is mechanically connected to rod member 16 by a cable connection 30. Positioned with handle 23 is a solenoid which will enable one to lift cover 12 only if the machine, e.g. the mailing machine or the modular postage meter, is "off". Thus the solenoid will not allow an operator, or user to open cover 12 if the machine is operating.

The cable 30 shown in FIG. 5 is connected to the handle 23 that is positioned in the front portion of the postage meter module. The other end of the cable is attached to a cable arm 31 which is attached to the bar or rod member 16. The rod 16 is biased in the clockwise direction by a tension spring (for example spring 33 shown schematically in FIG. 5) pulling on cable arm 31 or by a leg-, spiral- or torsion spring 32 wrapped around rod 16 against the pull of the cable. In alternate embodiments, rod 16 may also be biased by a gravity biasing mechanism 34 (see FIG. 5, for example a weight eccentrically mounted to the rod).

The pivot point of the arm 31 is coaxial with the bar 16, so when the cable 30 is pulled counterclockwise the cable arm 31 makes the bar 16 turn counterclockwise. This in turn moves the peg 19 out of the locked area of the slot cam 20. As soon as this happens, gas or other type springs attached to the top portion or cover 12 force the top cover in an upward direction to its open and locked position. As the top cover 12 reaches its open position and the peg 19 rides up the cam slot 20, the peg 19 goes into the locked position at the top of the slot. In this position the top is locked in an open position thereby making it safe for an operator to put his or her hand in the machine to clear a jam without fear that cover 12 will slam shut even if the opening spring force is not there due to failure of the spring(s). To close cover 12, the operator or user simply activates the handle again which removes the peg 19 out of the top locked position in slot 20, and allows the operator to push the top cover down and close it. This embodiment also permits one to be able to use the system according to the invention described herein without the springs generating the opening force (e.g. for cost reasons) and let the user open the cover on his own.

A variant of this embodiment, still within the scope of this invention is with the same locking mechanism as described above in the closed, lower position and without a locking position, that is the kneelike portion in the upper position of the cam follower surface. In this embodiment, the upper, open position is only held by the gas springs, or by a tension spring mechanism going over the dead point relative to the pivoting point. The advantage of such a design is the closing action goes without the need for unlocking via the handle just by pressing the cover down; the disadvantage is the lack of security in case of a failure of the opening springs.

It is therefore seen that an easy, safe and quick access to a machine for removal of paper jams can be achieved in a document transport apparatus by the present invention. One skilled in the art will appreciate that the present invention can be practiced by other than the specifically described embodiments, which embodiments have been presented for purposes of illustration and not for any purpose of limitation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A mechanism for freeing document jams in a machine that transports documents, the machine including a housing having an interior portion and a pivotable cover adapted to permit easy access to the interior portion of the machine housing, the cover pivoting from a closed and locked position to an open and locked position and being spring biased, comprising:

a handle member positioned on the cover;

a biased rod member having first and second end portions, the rod member being pivotable, but otherwise held fixed in the cover and mechanically coupled to the handle; and a slotted cam follower surface positioned on each opposite side of the housing, each surface having a bottom end portion and a top end portion, the first and second end portions of the rod coupled to each opposite side of the housing and adapted to follow the cam follower surfaces wherein the cover is positioned in the closed and locked position when the first and second end portions of the rod are positioned in the bottom end portion of the cam surface slot, and the cover is positioned in an open and locked position when the first and second end portions of the rod are positioned in the top end portion of the cam surface slot.

2. A mechanism according to claim 1 wherein said documents are envelopes or mailpieces.

3. A mechanism according to claim 1 wherein said machine is part of a module mailing machine.

4. A mechanism according to claim 1 wherein said machine is a document feeder.

5. A mechanism according to claim 1 wherein said machine is a dynamic weighing scale.

6. A mechanism according to claim 1 wherein said rod is biased by a tension spring biasing mechanism.

7. A mechanism according to claim 6 wherein said spring is a leg, spiral or torsion spring biasing mechanism.

8. A mechanism according to claim 1 wherein said rod is biased by a gravity biasing mechanism.

9. A mechanism according to claim 1 wherein both said first and second end portions of said rod are connected to arm members, and each of the arm members are connected to peg members, each peg member riding on one of said cam surfaces.

10. A mechanism according to claim 1 wherein both said bottom end portion of said cam surfaces and said top end portion of said cam surface are separated from the elongated substantially straight or a radius-curved portion of said cam surface by a knee-like bend in said cam surface.

11. A mechanism according to claim 10 wherein when a user of said mechanism activates said handle and makes an opening movement to open said cover and raises said cover from a closed and locked position to an open and locked position, the user exerts a force sufficient to position said first and second end portions of said rod over said knee positioned by said bottom end portion and through said straight portion of said cam surface and over said knee positioned by said top end portion of said cam surface.

12. A mechanism according to claim 11 wherein when a user of said mechanism activates said handle and makes an opening movement and lowers said cover from an opened and locked position to a closed and locked position, the user exerts a force sufficient to position said first and second end portions of said rod over said knee positioned by said top end portion and through said straight portion of said cam surface and over said knee positioned by said bottom end portion of said cam surface.

13. A mechanism according to claim 10 wherein an opening force on the mechanism is generated by at least one gas spring.

14. A mechanism according to claim 10 wherein an opening force on the mechanism is generated by at least one tension spring.

15. A mechanism according to claim 10 wherein an opening force on the mechanism is generate by at least one pressure spring.

16. A mechanism for freeing document jams in a machine that transports documents, the machine including a housing having an interior portion and a pivotable cover adapted to permit easy access to the interior portion of the machine housing, the cover being in a closed and locked position and being spring biased towards an open position comprising:

a handle member positioned on the cover;

a spring biased rod member having first and second end portions, the rod member being pivotable but otherwise held fixed in the cover and mechanically coupled to the handle; and a slotted cam follower surface positioned on each opposite side of the housing, each surface having a bottom end portion and a top end portion, the first and second end portions of the rod coupled to each opposite side of the housing and adapted to follow the cam follower surfaces wherein the cover is positioned in the closed and locked position when the first and second end portions of the rod are positioned in the bottom end portion of the cam surface slot, and the cover is positioned in an open and locked position when the first and second end portions of the rod are positioned in the top end portion of the cam surface slot.

17. A mechanism for freeing document jams in a machine that transports documents, the machine including a housing having an interior portion and a pivotable cover adapted to permit easy access to the interior portion of the machine housing, the cover being in an open and locked position comprising:

a handle member positioned on the cover;

a biased rod member having first and second end portions, the rod member being pivotable but otherwise held fixed in the cover and mechanically coupled to the handle; and a slotted cam follower surface positioned on each opposite side of the housing, each surface having a bottom end portion and a top end portion, the first and second end portions of the rod coupled to each opposite side of the housing and adapted to follow the cam follower surfaces wherein the cover is positioned in the closed and locked position when the first and second end portions of the rod are positioned in the bottom end portion of the cam surface slot, and the cover is positioned in an open and locked position when the first and second end portions of the rod are positioned in the top end portion of the cam surface slot.

* * * * *